United States Patent [19]

Hamaguchi et al.

[11] Patent Number: 4,547,545
[45] Date of Patent: Oct. 15, 1985

[54] HIGH DENSITY INFORMATION RECORD MADE OF A CONDUCTIVE RESIN COMPOSITION COMPRISING A SPECIFIC TYPE OF DIMETHYLPOLYSILOXANE

[75] Inventors: Toshiaki Hamaguchi; Kazuhira Namikawa, both of Yokohama; Toshikazu Goshima, Sagamihara; Mutsuaki Nakamura; Akio Kuroda, both of Yokohama; Yoshiaki Kudo, Tokyo, all of Japan

[73] Assignees: Victor Company of Japan, Ltd.; Shin-Etsu Chemical Co., Ltd., both of Japan

[21] Appl. No.: 603,761

[22] Filed: Apr. 13, 1984

[30] Foreign Application Priority Data

Apr. 20, 1983 [JP] Japan .................................. 58-68447

[51] Int. Cl.$^4$ ............................................... C08K 5/54
[52] U.S. Cl. ................................... 524/269; 252/511; 369/286

[58] Field of Search ............... 524/261, 269; 252/511; 369/286

[56] References Cited

U.S. PATENT DOCUMENTS 4,414,660 11/1983 Wang et al. ......................... 428/161

FOREIGN PATENT DOCUMENTS 1574595 9/1980 United Kingdom .

Primary Examiner—Joseph L. Schofer
Assistant Examiner—N. Sarofim
Attorney, Agent, or Firm—Lowe, King, Price & Becker

[57] ABSTRACT

A high density information record of the electrostatic capacitance type which comprises a record substrate on which signal information is recorded as geometric variations. The substrate is made of a conductive resin composition comprising a thermoplastic resin, a conductive material, and a defined amount of a specific type of dimethylpolysiloxane lubricant having a degree of inhomogeneity of 1.0 to 1.3 and a degree of polymerization of 12 to 60.

4 Claims, No Drawings

HIGH DENSITY INFORMATION RECORD MADE OF A CONDUCTIVE RESIN COMPOSITION COMPRISING A SPECIFIC TYPE OF DIMETHYLPOLYSILOXANE

BACKGROUND OF THE INVENTION

1. Field of the Invention

This invention relates to playback systems of a variable electrostatic capacitance form and more particularly to, high density information records, such as video or digital audio discs, on which signal information is recorded as geometric variations.

2. Description of the Prior Art

In certain information playback systems, signal information is encoded as geometric variations or pits in a spiral plane or groove or in concentric planes or grooves on an information recording medium or substrate. The medium on which the signal information has been recorded is reproduced as follows. When a pickup stylus such as of diamond having an electrode is scanned relative to a recorded track of the medium, capative variations are established between the pickup stylus and the medium due to the geometric variations in the plane or groove.

Several types of information records have been proposed for use in the above-described type of electrostatic capacitance playback system. In one such record, an electrode is provided on the surface of a record substrate on which geometric variations are press molded according to signal information in order to permit an electrostatic capacitance to be established between the record electrode and the stylus electrode. For instance, the record substrate is covered with a thin metallic film of several hundreds angstrom in thickness and a several hundred angstrom thick dielectric layer overlying the metallic film. The dielectric layer serves to prevent short circuiting of the electrodes and increase the dielectric constant between the electrodes. The record of the above-described type needs a number of fabricating steps including a press molding of the recording medium substrate, steps of depositing the thin metallic film and the dielectric layer, and the like. Thus, the fabrication is complicate and troublesome with a need of a relatively large-scale manufacturing apparatus. Thus, production cost becomes very high.

Another type of known information record of the electrostatic capacitance form is one which is obtained by press molding a conductive plastic composition comprising a resin such as polyvinyl chloride in admixture with a conductive material such as carbon black so that signal information is recorded as geometric variations. This record is fabricated without needing the step of depositing a thin metallic film because the record itself is conductive and an electrostatic capacitance is formed between the electrode of a pickup stylus and the record. Moreover, fine carbon black powder is substantially covered with the resin, so that any dielectric layer is not necessary. Thus, this type of record is very simple in manufacture and can be manufactured at low cost.

However, when the record made of the conductive resin composition is mounted in a playback system and reproduced over a long term, its surface is worn by means of the pickup stylus contacting therewith. This results in deformation of the geometric variations or pits formed on the record, causing capative variations to change. Thus, reliable playback is not possible. Especially, when a video disc is subjected to still reproduction or freeze frame, a given portion of the disc is repeatedly contacted with a pickup stylus at a pressure of 400 to 500 Kg/cm$^2$ at a rate of 15 times/second, causing the disc surface to be considerably worn. It will be noted that the above type of video disc is relatively poor in wear resistance not only in the still reproduction, but also in ordinary reproduction cycles and the critical number of reproduction is lower than 100.

In addition, press moldability of the conductive resin composition is not so good.

We have made extensive studies on conductive resin compositions suitable for high density information record and particularly on lubricants being added to resin compositions. It was found that some lubricants do not show satisfactory effects of lubrication and cause breeding, thus leading to a lowering in quality of the playback image. Alternatively, some lubricants produce several disadvantages in that resin compositions comprising such lubricants are not satisfactorily kneaded in continuous kneaders or extruders nor suitably molded in press molding machines.

SUMMARY OF THE INVENTION

It is accordingly an object of the invention to provide high density information records which are made of a conductive resin composition comprising a specific type of polyorganosiloxane lubricant.

It is another object of the invention to provide high density information records of the electrostatic capacitance type in which signal information is recorded by means of geometric variations and in which the geometric variations are rarely deformed because the record is resistant to wear and thus reliable playback of the signal information is ensured.

It is a further object of the invention to provide high density information records made of conductive resin compositions comprising dimethylpolysiloxane by which little or no deformation of encoded pits take place even when frequently subjected to still reproduction and such records are durable and have a long life.

It is a still further object of the invention to provide high density information records which can be press molded without involving soiling of stamper faces and causing any tracking errors.

The present invention is characterized by use of dimethylpolysiloxane of a specific type as a lubricant in a conductive resin composition for high density information record. Dimethylpolysiloxane used in the present invention should have a degree of inhomogeneity of 1.0 to 1.3 and a degree of polymerization of from 12 to 60. More particularly, the present invention provides a high density information record of the electrostatic capacitance type which comprises a record substrate on which signal information is recorded as geometric variations, the substrate being made of a conductive resin composition comprising a thermoplastic resin, a conductive material used in an amount of 5 to 30 percent by weight based on the thermoplastic resin and a dimethylpolysiloxane lubricant of the above-mentioned type used in an amount of 0.3 to 2.0 percent by weight based on the thermoplastic resin. The term "high density information record" used herein is intended to mean video or digital audio discs. The term "degree of inhomogeneity" means a ratio of weight average molecular weight and number average molecular weight.

DETAILED DESCRIPTION AND PREFERRED EMBODIMENTS OF THE INVENTION

As described above, the conductive resin composition for a high density information records comprises dimethylpolysiloxane as a lubricant. The dimethylpolysiloxane used in the practice of the invention should have a degree of inhomogeneity of 1 to 1.3 and a degree of polymerization of from 12 to 60. Preferably, dimethylpolysiloxane has a relatively low viscosity which may vary depending on the degree of inhomogeneity as will be discussed hereinafter. This is because too high a viscosity results in unsatisfactory wear resistance. When a video disc using such a high viscosity lubricant is subjected to a freeze frame or still reproduction test, its signal-to-noise ratio may significantly deteriorate even in several tens minutes or may cause tracking errors. On the contrary, when the viscosity is too low, a satisfactory wear resistance cannot be attained.

Dimethylpolysiloxane is generally used in an amount of 0.3 to 2.0 wt% based on a thermoplastic resin used. Larger amounts are undesirable because dimethylpolysiloxane exudes at the time of press molding, leading to soiling of stamper faces therewith, and incapability of exact formation of geometric variations. Moreover, tracking errors may take place. On the contrary, less amounts result in less effects than as desired.

The degree of inhomogeneity of dimethylpolysiloxane is broadly in the range of 1.0 to 1.3 as defined before. This degree may vary depending on the viscosity of the polysiloxane. When dimethylpolysiloxane has a viscosity ranging from 15 to 30 cps at 25° C., the degree is preferably in the range of 1.0 to 1.2. When the viscosity is in the range of from 30 to 65 cps, the degree of inhomogeneity is in the range of 1.0 to 1.3. This type of dimethylpolysiloxane has a narrower range of molecular weight distribution than ordinary or commercially available dimethylpolysiloxane. For example, ordinary dimethylpolysiloxane having a viscosity of 50 cps at 25° C. has a degree of inhomogeneity of 1.48, whereas dimethylpolysiloxane used in the present invention having the same viscosity has a degree of inhomogeneity of 1.07.

Dimethylpolysiloxane having a degree of inhomogeneity of 1.0 to 1.3 and having a viscosity of 30 to 65 cps at 25° C. is prepared by known processes such as disclosed in Japanese Patent Publication Nos. 45-1070 and 47-44040. Alternatively, dimethylpolysiloxane having a viscosity of 15 to 30 cps at 25° C. and a degree of inhomogeneity of 1.0 to 1.2 may be prepared as follows: crude dimethylpolysiloxane product obtained by ring-scission polymerization using a concentrated sulfuric acid catalyst such as described in the above Japanese Publications or J. Am. Chem. Soc., 68, 358 (1949) is fractionally distilled or stripped under high vaccum conditions.

The thermoplastic resins useful for the purposes of the invention include, for example, vinyl chloride resins, vinyl chloride-vinyl acetate copolymers, vinyl chloride-ethylene copolymers, vinyl chloride-propylene copolymers, vinyl chloride-alkyl acrylate copolymers, acrylonitrile-styrene-vinyl chloride copolymers, ethylene-vinyl acetate copolymers grafted with vinyl chloride, and the like.

The conductive material used in the conductive resin composition is typically carbon black. Other materials including metals such as copper, gold and platinum and organic materials such as polyacetylene may be also used in powder form. In order to impart a suitable electric conductivity to the composition, the conductive material is generally used in an amount of from 5 to 30 percent by weight of thermoplastic resin though the amount may depend on the type of conductive material, the type of thermoplastic resin and the purpose.

Aside from the essential three components described above, additives ordinarily used for these purposes may be also added to the composition in amounts not impeding the effects of the essential components. Examples of such additives include heat stabilizers, plasticizers, other lubricants, and the like.

The conductive resin composition is prepared by a usual manner. For instance, a predetermined amount of a thermoplastic resin is mixed with predetermined amounts of dimethylpolysiloxane and other additives in a mixer or blender at high agitation speed until the system is heated to 80° to 135° C. followed by adding a predetermined amount of carbon black or the like conductive material and further mixing. The resulting mixture is pelletized by a suitable pelletizer. The pellets are used to press-mold a video or audio disc. These mixing, pelletizing and press-molding techniques are well known in the art and are not further described herein.

The present invention is described in detail by way of preparatory examples and examples.

PREPARATORY EXAMPLE 1

148 g of hexamethylcyclotrisiloxane, 18 g of acetonitrile and 1.8 g of water were charged into a one liter reactor equipped with an agitator, a reflux condenser and a thermometer, to which was added 0.13 g of a pentavalent silicon complex catalyst of the formula,

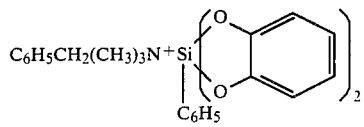

followed by reaction at 60° C. for 5 hours. The reaction mixture was cooled, after which 19.0 g of pyridine was added. Subsequently, 26.0 g of trimethylchlorosilane was dropped into the mixture under ice-cooling conditions with agitation, which was further agitated for 3 hours at a normal temperature, followed by washing with diluted hydrochloric acid and then with water until the washing was confirmed to be neutral by the use of bromothymol indicator.

The thus obtained crude product was dehydrated with neutral anhydrous Glauber's salt and subjected to stripping in order to remove small amounts of low boiling components therefrom, thereby obtaining 131 g of oily dimethylpolysiloxane. This polysiloxane had a viscosity of 19.4 centistokes at 25° C., a specific gravity of 0.953, a refractive index of 1.4011, and a degree of imhomogeneity of 1.18 when calculated from a gel transmission chromatograph thereof.

PREPARATORY EXAMPLE 2

The general procedure of Preparatory Example 1 was repeated except that 222 g of hexamethylenecyclotrisiloxane and 0.75 g of pentavalent silicone complex as used in Preparatory Example 1 were used, thereby obtaining oily dimethylpolysiloxane having a viscosity of 29.7 centistokes at 25° C., a specific gravity of 0.961, a refractive index of 1.4203 and a degree of inhomogeneity of 1.17

The dimethylpolysiloxane products obtained above were used in the following examples.

EXAMPLE 1

One hundred parts by weight of ethylene-vinyl chloride copolymer having an average degree of polymerization of 430 and an ethylene content of 1.5% (VE-N, by Tokuyama Sekisui Ind. Co., Ltd.), 5 parts by weight of chlorinated polyethylene (Elaslen 301A, by Showa Denko Co., Ltd.), 5 parts by weight of dibutyl tin mercapto ester stabilizer (STANN JF-95, by Sankyo Organic Chemicals Co., Ltd.), 1.5 parts by weight of a polyester lubricant (Loxiol G-70, by Nippon Henkel Co., Ltd.), 0.5 part by weight of a fatty alcohol and dibasic acid ester (Loxiol G-60, Nippon Henkel Co., Ltd.), and 0.4 part by weight of dimethylpolysiloxane obtained in Preparatory Example 1 having a viscosity of 19.4 centistokes at 25° C. and having a degree of inhomogeneity of 1.18 were placed in a 20 liter Henschel mixer and blended at high agitation speed until the blend was heated to 110° C. Subsequently, the mixer was operated at low speed to cool the content down to 70° C., followed by adding 20 parts by weight of conductive carbon black (Ketjen Black EC, by Japan EC Co., Ltd.) and blending at 110° C. for 15 minutes. Thereafter, the mixer was operated at low speed until the content was cooled down to 50° C. The resulting blend was pelletized by means of a kneader PR-46 available from Buss Co., Ltd., Switzerland. The resulting pellets were press molded in a press machine for video disc to obtain video discs having video information in a spiral groove on the surface thereof.

EXAMPLE 2

The general procedure of Example 1 was repeated using 0.4 part by weight of dimethylpolysiloxane obtained in Preparatory Example 2 having a viscosity of 29.7 centistokes at 25° C. and having a degree of inhomogeneity of 1.17 instead of the dimethylpolysiloxane used in Example 1, thereby obtaining video discs.

EXAMPLE 3

The general procedure of Example 2 was repeated using 0.7 part by weight of the dimethylpolysiloxane, thereby obtaining video discs.

Comparative Example 1

The general procedure of Example 1 was repeated using 0.4 part by weight of dimethylpolysiloxane having a viscosity of 50 centistokes at 25° C. and a degree of inhomogeneity of 1.48 (KF-96, made by Shinetsu Chem. Ind. Co., Ltd.) instead of the dimethylpolysiloxane used in Example 1, thereby obtaining video discs.

Comparative Example 2

The general procedure of Comparative Example 1 was repeated using 0.7 parts by weight of the dimethylpolysiloxane, thereby obtain video discs.

Comparative Example 3

The general procedure of Comparative Example 1 was repeated using 1 part by weight of the dimethylpolysiloxane, thereby obtain video discs.

The video discs obtained in the above examples and comparative examples were each subjected to a one hour still reproduction test to determine a degree of wear or a degree of deterioration of signal-to-noise ratio. During the test, there was measured a Y signal-to-noise ratio of each disc at gray 50IRE recorded at a position thereof where it took 54 minutes from the outermost track of the video disc. The degree of deterioration of signal-to-noise ratio was determined such that ten to twelve video discs of the respective examples and comparative examples were provided. Each disc was tested three times while changing the track every hour. Thirty to thirty six measurements were effected, in total, on the video discs of each of the examples and comparative examples. The discs whose degree of deterioration was within 3 dB were determined as acceptable, whereas determined as unacceptable were discs whose degree of deterioration was over 3 dB or with which jump of the stylus took place. The degree of deterioration is shown in Table as acceptance rate by percent.

Moreover, the video discs obtained in the examples and comparative examples were each set in a playback apparatus and reproduced at a normal speed from initial to final recorded signals to check a continuous reproducible time. The moldability, into video disc, of each resin composition used in the examples and comparative examples was observed. These results are also shown in Table below.

TABLE

|  | Acceptance Rate (%) | Continuous Reproducible Time | Moldability |
| --- | --- | --- | --- |
| Example 1 | 86 (no jump of stylus) | about 300 hrs. | good (no soiling) |
| Example 2 | 85 (no jump of stylus) | about 300 hrs. | good (no soiling) |
| Example 3 | 100 (no jump of stylus) | over 700 hrs. | good (no soiling) |
| Com. Ex. 1 | 25 (frequent jumps of stylus) | — | moderate |
| Com. Ex. 2 | 64 | 60–90 hrs. | poor (oil soiling) |
| Com. Ex. 3 | 77 (some jumps of stylus) | 80–160 hrs. |  |

As will be seen from the above results, use of the specific type of dimethylpolysiloxane within defined ranges with respect to the degree of inhomogeneity and amount is very effective in making high density information records.

What is claimed is:

1. A high density information record of the electrostatic capacitance type which comprises a record substrate on which signal information is recorded as geometric variations, the substrate being made of a conductive resin composition comprising a thermoplastic resin selected from the group consisting of vinyl chloride resins, vinyl chloride-vinyl acetate copolymers, vinyl chloride-propylene copolymers, acrylonitrile-styrene-vinyl chloride copolymers, and ethylene-vinyl acetate copolymers grafted with vinyl chloride, a conductive material in an amount of from 5 to 30 percent by weight based on the amount of the thermoplastic resin, and a dimethylpolysiloxane lubricant having a degree of inhomogeneity of 1.0 to 1.3 and a degree of polymerization 12 to 60, the lubricant being present in an amount of 0.3 to 2.0 percent by weight based on the thermoplastic resin.

2. The high density information record according to claim 1, wherein said conductive material is carbon black.

3. The high density information record according to claim 1, wherein said dimethylpolysiloxane has a viscosity ranging from 15 to 30 cps at 25° C. and a degree of inhomogeneity of 1.0 to 1.2.

4. The high density information record according to claim 1, wherein said dimethylpolysiloxane has a viscosity ranging from 30 to 65 cps at 25° C. and a degree of inhomogeneity of 1.0 to 1.3.

* * * * *